(12) United States Patent
Rojo

(10) Patent No.: US 8,845,076 B2
(45) Date of Patent: Sep. 30, 2014

(54) CHAIN POSITIONING SYSTEM

(75) Inventor: Oscar Moya Rojo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 13/534,914

(22) Filed: Jun. 27, 2012

(65) Prior Publication Data

US 2014/0000393 A1 Jan. 2, 2014

(51) Int. Cl.
*B41J 2/165* (2006.01)

(52) U.S. Cl.
USPC .................................. 347/36; 347/22; 347/32

(58) Field of Classification Search
None
See application file for complete search history.

(56) References Cited

U.S. PATENT DOCUMENTS

| | | | |
|---|---|---|---|
| 6,890,278 B2 * | 5/2005 | Prince | 474/206 |
| 8,235,254 B2 * | 8/2012 | Post et al. | 222/333 |
| 2007/0039497 A1 * | 2/2007 | Studer et al. | 101/405 |

* cited by examiner

*Primary Examiner* — Geoffrey Mruk

(57) ABSTRACT

A chain positioning system is disclosed that has a chain that contains a plurality of links joined together, end-to-end, with a plurality of pins. The chain can be moved between a retracted position and an extended position. The links of the chain limit rotation about the pins in one direction.

8 Claims, 10 Drawing Sheets

CHAIN POSITIONING SYSTEM

BACKGROUND

Many devices have objects that must be moved from a storage location to a use location. For example, inkjet printers typically contain a spittoon that is used to service the inkjet head. The spittoon is typically stored in a storage location during printing. When the inkjet head needs to be cleaned the spittoon is moved to a cleaning location where the inkjet head can be serviced.

DETAILED DESCRIPTION

FIG. 1-12, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

In one example embodiment of the invention, a chain that acts as a structural beam when extended in a horizontal direction will be used to move a spittoon between a storage positing and a cleaning position. The chain has links that limit the rotation between links in one direction, but allows the links to rotate with respect to each other in the opposite direction. In one example the chain has teeth formed on one side such that when the chain is curved around a radius the teeth form a spur gear that allows the chain to be accurately positioned with a simple drive gear. In another example the chain has teeth formed on one side such that when the chain is straight the teeth form a rack for a rack and pinion gear that allows the chain to be accurately positioned with a simple drive gear.

Figure 1:
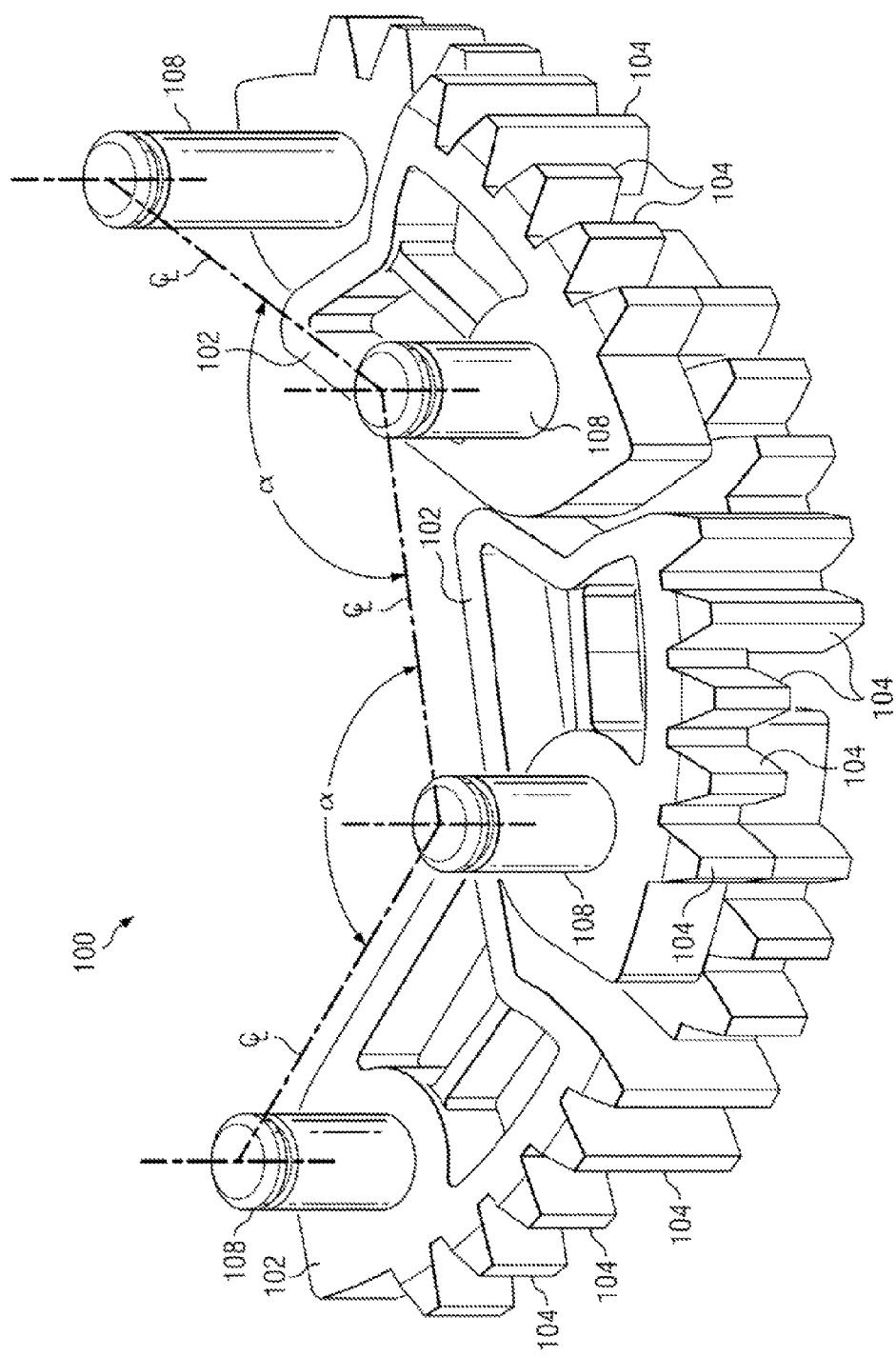
FIG. 1 is an isometric view of a section of chain 100 in an example embodiment of the invention.

FIG. 1 is an isometric view of a section of chain 100 in an example embodiment of the invention. Chain section 100 comprises a number of links 102 and a number of pins 108. In this view the rollers and roller clips (not shown) have been removed from the pins 108 for clarity. Each link 102 is joined to adjacent links with pins 108. Each link 102 has a plurality of teeth 104 formed on its bottom side. A centerline (CL) for each link 102 is formed between the centerline of the two pins 108 in each link. The links 102 are shown in a curved or rotated position where an angle α is formed between the centerlines for each link 102. The angle α shown is the angle that aligns the teeth 108 between the multiple links 102 such that a continuous spur gear is formed along the bottom of the chain 100.

Each link 102 is configured such that the rotation of the links relative to each other is free in one direction but limited in the opposite direction (as explained below). In FIG. 1, the links 102 are free to rotate such that the angle α gets smaller. When the links 102 rotate in the opposite direction such that the angle α gets larger, the rotation is limited. Once the angle α is equal to 180 degrees, the links prevent further rotation in this direction with respect to each other (i.e. angle α is limited to 180 degrees or less). When chain 100 is deployed in a horizontal position with the bottom of the chain down (the side with gears on it) the chain forms a beam that can support its own weight in addition to a load.

Figure 2:
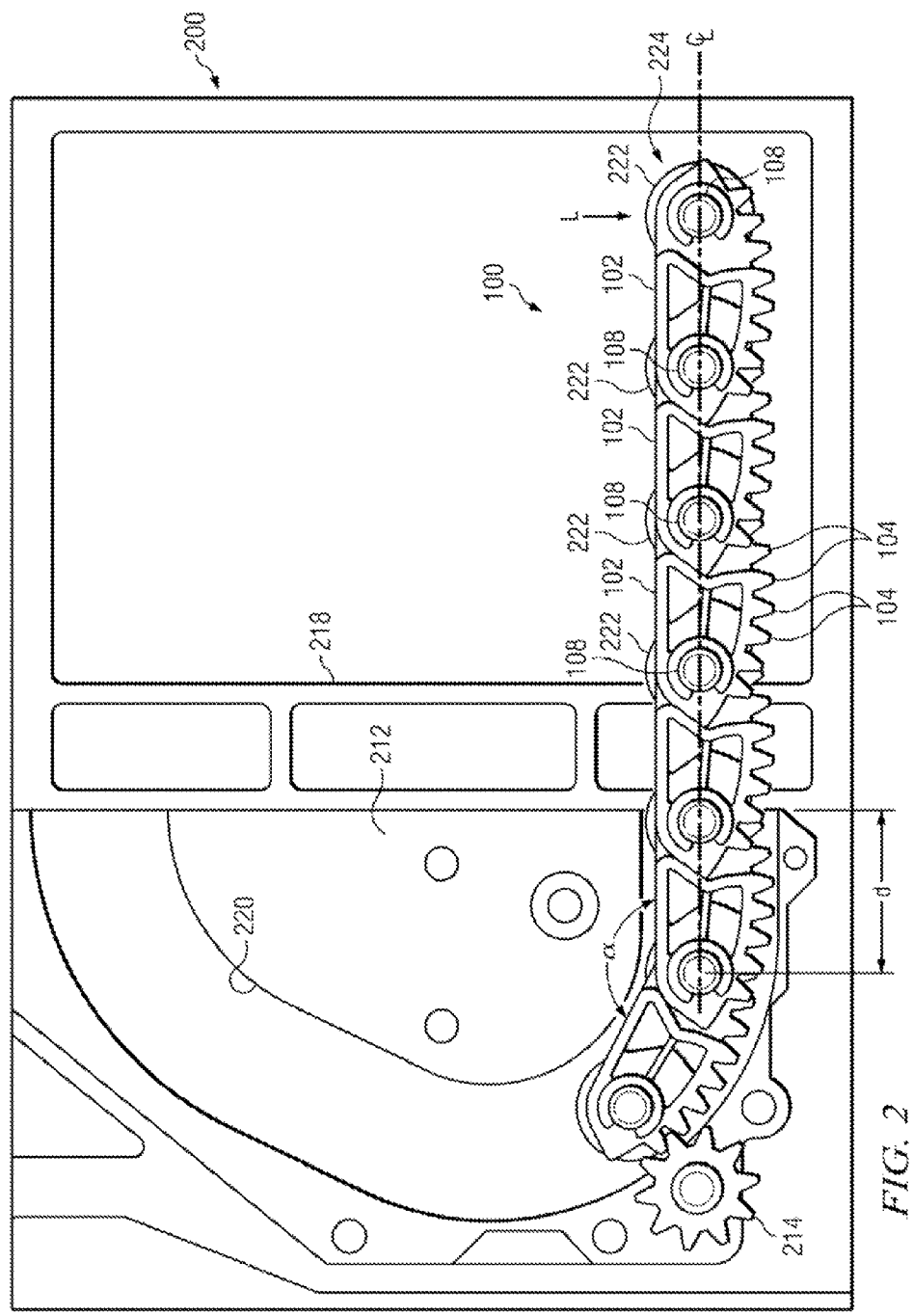
FIG. 2 is a cutaway side view of a chain positioning system 200 in an example embodiment of the invention.

FIG. 2 is a cutaway side view of a chain positioning system 200 in an example embodiment of the invention. Chain positioning system 200 comprises a frame 218, a guide plate 212, a chain 100, and a drive gear 214. Guide plate 212 is mounted in frame 220. Drive gear 214 is mounted in guide plate 212 adjacent to a curved section of a channel 214 formed in guide plate 212. Chain 100 is positioned in channel 220 and is comprised of a plurality of links 102 joined together by pins 108. A centerline (CL) for each link 102 is formed between the centerline of the two pins 108 in each link. Each link 102 has teeth 104 formed on its bottom side. The teeth formed in the bottom side of links 102 mesh with drive gear 214. Rollers 222 are mounted on each pin 108 and guide chain 100 in channel 220. Chain 100 is shown in the extended position in FIG. 2. In the extended position, at least one link at one end of the chain is engaged with drive gear 214. Almost all of the other links in the chain extend beyond guide plate 212 in a horizontal orientation.

Angle α is the angle between the centerlines of adjacent links 102 measured on the top side of the chain 100. When the chain 100 is in the curved section of channel 220, angle α is less than 180 degrees. There is a straight section in channel 220 where it exits guide plate 212. As chain 100 travels from the curved section of channel 220 into the straight section of channel 220, the angle α between the links increase from less than 180 to 180 degrees. The straight section is at least distance d in length where distance d is equal to twice the distance between pins 108 in a single link 102 (not shown for clarity). Because the links 102 prevent angle α from increasing beyond 180, the chain 100 forms a horizontal beam as it exits guide plate 212. In the horizontal position, chain 100 is ridged enough to support its own weight as well as load L. Load L may correspond to the weight of a device mounted to chain 100.

Figure 3:
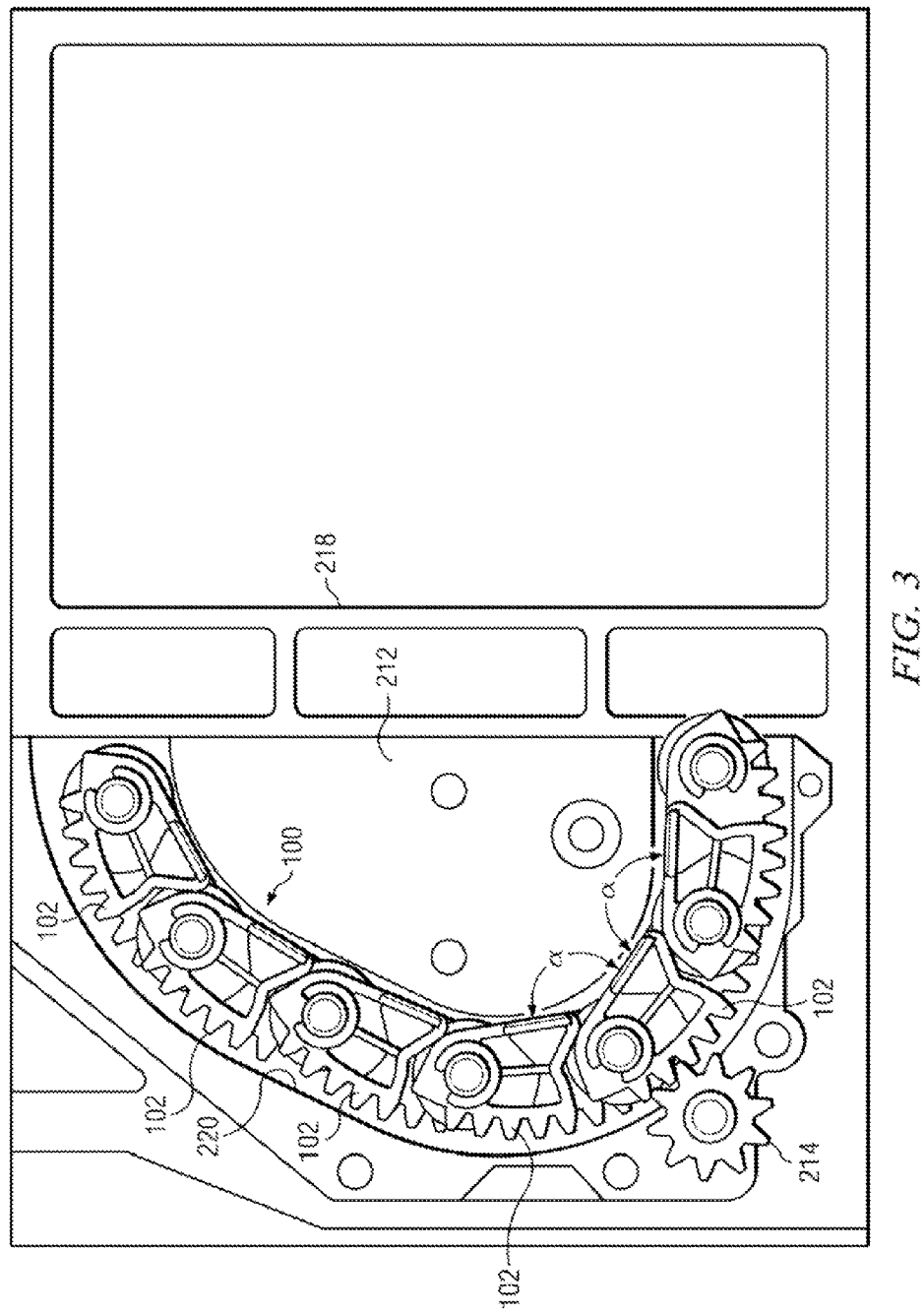
FIG. 3 is the cutaway side view of FIG. 2 shown with the chain in a retracted or storage position, in an example embodiment of the invention.

FIG. 3 is the cutaway side view of FIG. 2 shown with the chain in a retracted or storage position, in an example embodiment of the invention. In the retracted position, only the tip of chain 100 extends beyond the edge of guide plate 212. The rest of the chain is retracted or stored in guide plate 212. In operation, a device can be attached to the end of chain 100 at its tip 224, for example a spittoon. The chain positioning system can be used to move the device from the retracted position of the chain to the extended position of the chain. The retracted position of chain 100 would typically correspond to a storage location for the device and the extended position of chain 100 corresponds to a use position for the device. Because the position of the chain 100 is controlled by drive gear 214, a device attached to the tip 224 of chain 100 can be accurately positioned along the horizontal axis of chain 100.

Figure 4:
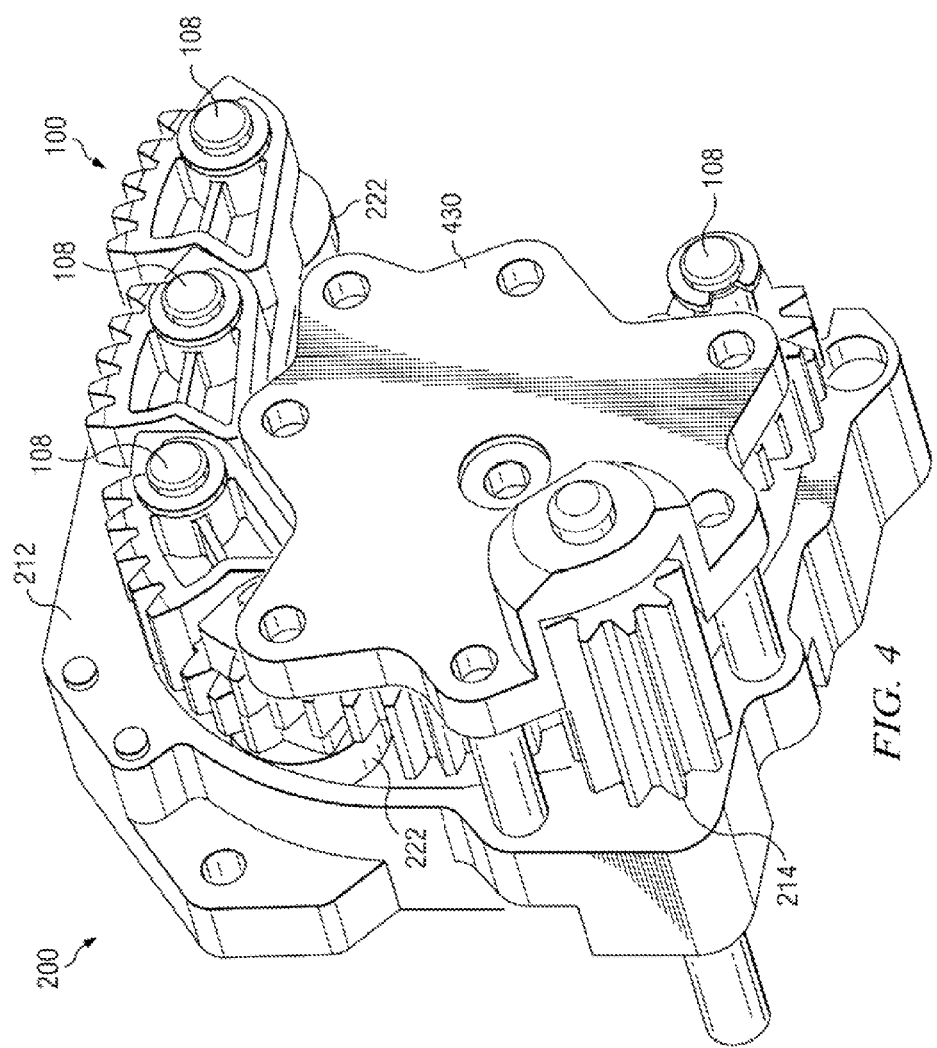
FIG. 4 is an isometric side view of the chain positioning system 200 in an example embodiment of the invention.

FIG. 4 is an isometric side view of chain positioning system 200 in an example embodiment of the invention. Chain positioning system 200 comprises a guide plate 212, a chain 100, a cover plate 430 and a drive gear 214. Chain 100 has a plurality of rollers 222 mounted to the pins 108 that join the links 102 together. Rollers 222 ride in the channel 220 formed in guide plate 212. Cover plate 430 mounts to guide plate 212 and retains chain 100 in channel 220.

Figure 5:
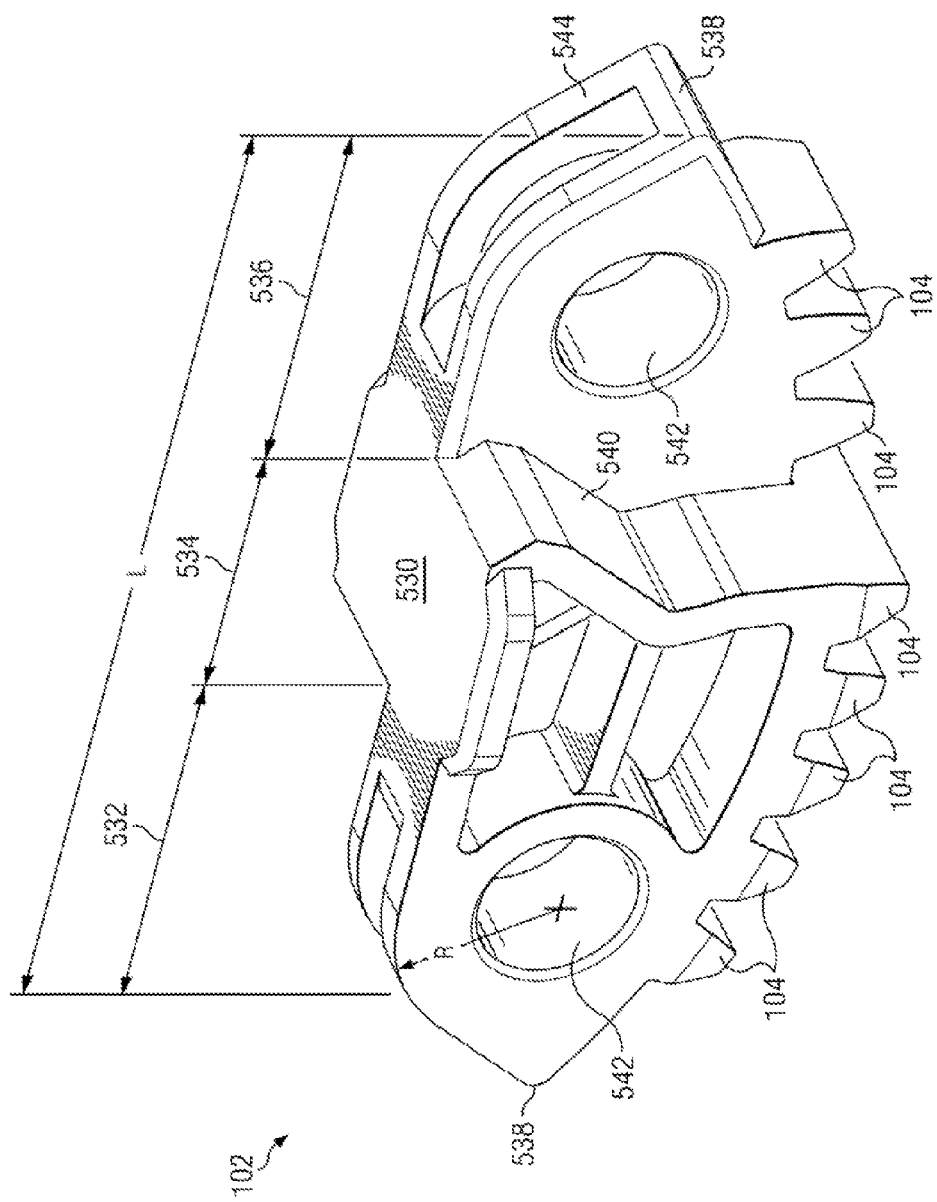
FIG. 5 is an isometric side view of a link 102 in an example embodiment of the invention.

FIG. 5 is an isometric side view of a link 102 in an example embodiment of the invention. Link 102 can be formed from a variety of materials, for example plastic, metal or the like. Link 102 has a length L and is divided into three sections along its length. Link 102 has a middle section 534 and two end sections (532 and 536) on either side of the middle section 534. Link 102 has a top side 530 and a bottom side opposite the top side 530. A plurality of teeth 104 are formed along the bottom side of link 102.

There is a hole 542 formed in each end section (532 and 536). The holes 542 are perpendicular to the length L and are parallel to each other. A link centerline runs between the centers of the two holes. Pins 108 are inserted into each hole to join individual links into a chain. When joined together the links can rotate about pins 108. An angle α is formed between the centerlines of two links when joined together. Angle α is measured on the top side of the links, but could also be measured from the bottom side of the two links.

The middle section 534 has a stop 540 formed adjacent to each of the two end sections (532 and 536). Each end section (532 and 536) has a tip 538. The top surface of tips 538 forms faces 544. The top surface 530 of link 102 is joined to the two faces 538 along radius R. Where radius R is centered on the two holes 542. When two links are joined together, the face 538 of one link limits rotation in one direction about pin 108 by contacting the stop 540 on the other link (see FIGS. 6 and 7). In this way the two links interlock to prevent or limit rotation about the pin.

Figure 6:
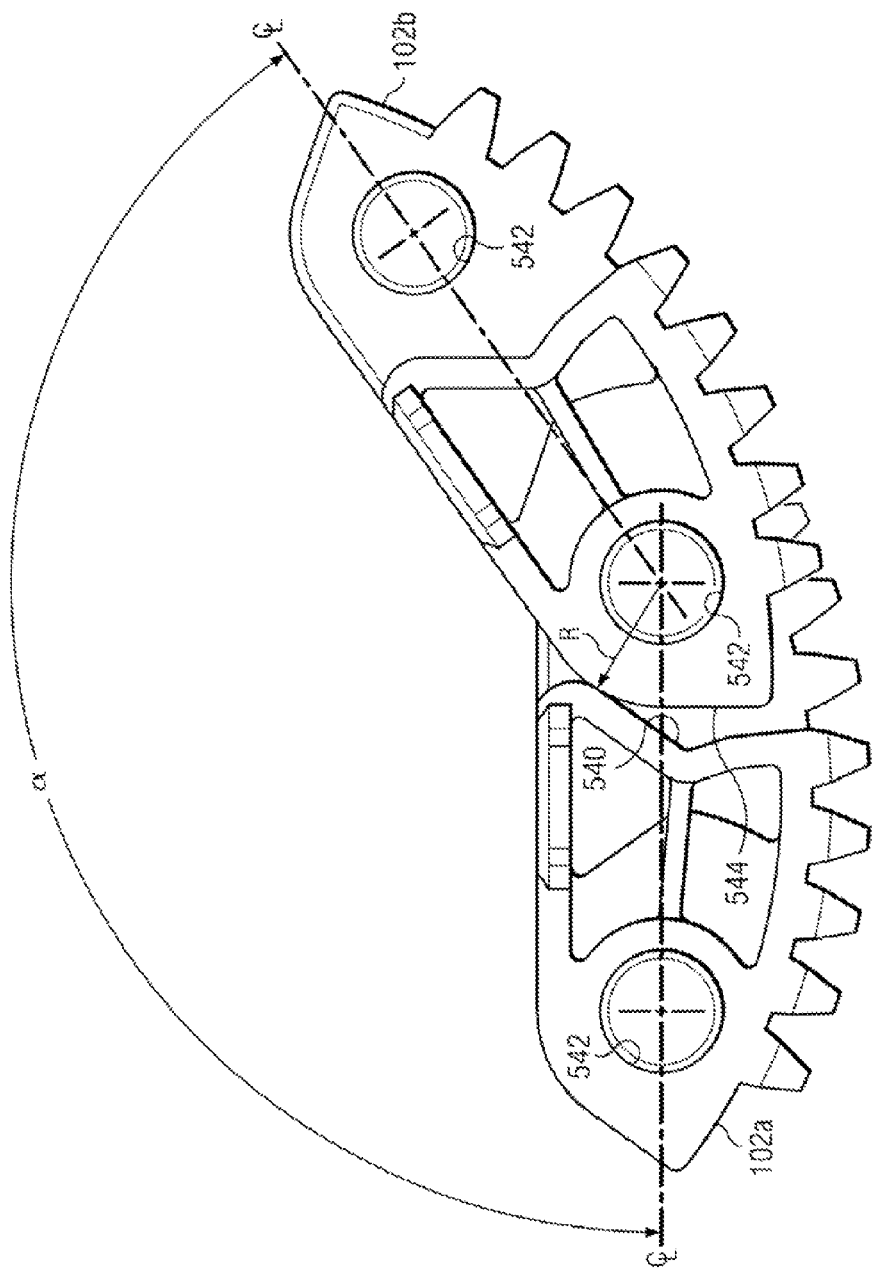
FIG. 6 is a side view of two links (102a and 102b) aligned in a curved orientation in an example embodiment of the invention.

FIG. 6 is a side view of two links (102a and 102b) aligned in a curved orientation in an example embodiment of the invention. A link centerline (CL) runs between the centers of the two holes 542 formed in each link 102. Angle α is the angle between the two link centerlines. Angle α is less than 180 degrees. When angle α is less than 180 degrees there is a gap between stop 540 on link 102a and face 544 on link 102b. As angle α increases the gap between stop 540 on link 102a and face 544 on link 102b decreases. When angle α is 180 degrees the gap between stop 540 on link 102a and face 544 on link 102b is eliminated and face 544 on link 102b is in contact with stop 540 on link 102a. The contact between the face 544 and the stop 540 limits further rotation and interlocks the links into a horizontal beam.

Figure 7:
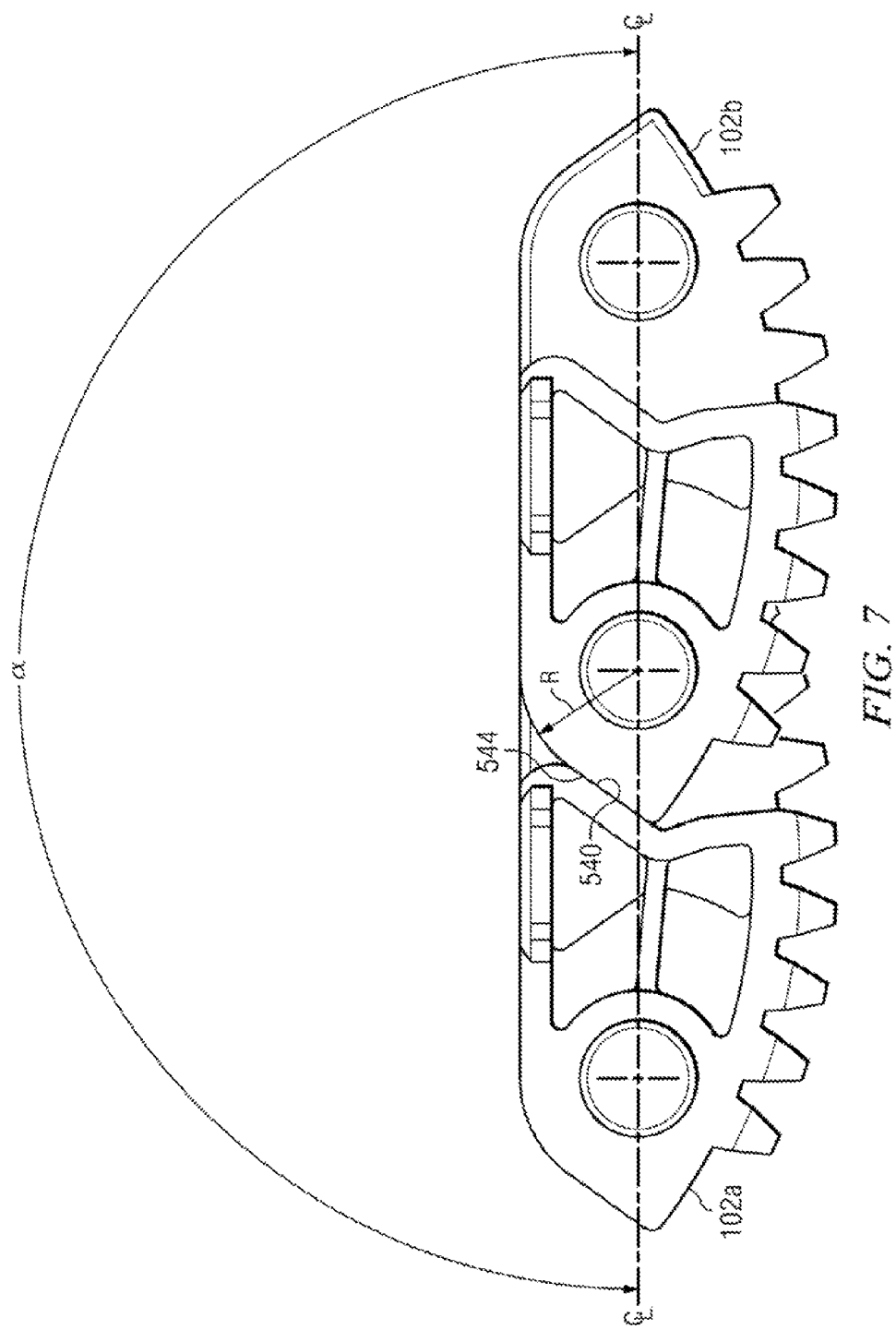
FIG. 7 is a side view of two links (102a and 102b) aligned in a horizontal orientation in an example embodiment of the invention.

FIG. 7 is a side view of two links (102a and 102b) aligned in a horizontal orientation in an example embodiment of the invention. In FIG. 7 angle α is 180 degrees. In FIG. 7 face 544 on link 102b is in contact with stop 540 on link 102a thereby limiting further rotation of the links relative to each other in this direction. Radius R allows rotation about pin 108 in the other direction. By adjusting the position and angle between stop 540 and face 544, the angle α between two links can be limited to almost any value. In this example, the angle α between two links is limited to 180 degrees or less. This creates a horizontal beam as the chain is extended.

Figure 8:
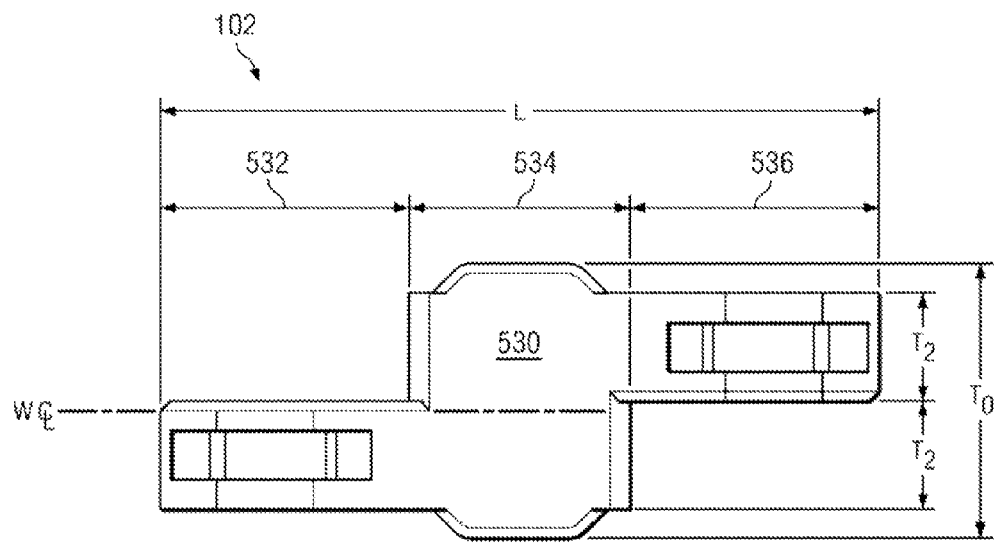
FIG. 8 is a top view of link 102 in an example embodiment of the invention.

FIG. 8 is a top view of link 102 in an example embodiment of the invention. Link 102 has a length L and is divided into three sections along its length. Link 102 has a middle section 534 and two end sections (532 and 536) on either side of the middle section 534. Link 102 has a width T0 with a width centerline (WCL) that runs parallel to the length and centered in width T0. Each end section has a width T2. Width T2 is no more than half the width T0 of link 102. One of the end sections 532 is offset to the side of the middle section in a first direction (shown as below the WCL). The other end section 536 is offset to the side of the middle section in the opposite direction (shown as above the WCL).

Figure 9:
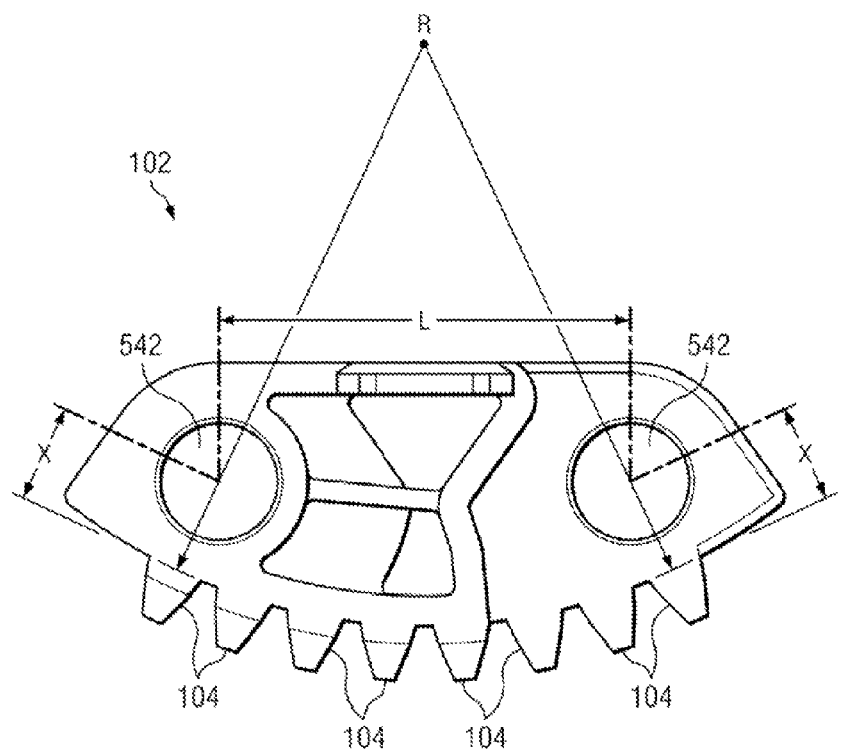
FIG. 9 is a side view of a link 102 in an example embodiment of the invention.

FIG. 9 is a side view of a link 102 in an example embodiment of the invention. Link 102 has a plurality of teeth 104 formed on the bottom side of link 102. The plurality of teeth are formed along a radius R. The distance between the two holes 542 formed in each end section is distance L. Distance L is related to the number of teeth each link contains. The distance between the center of each hole 542 and the spur gear radius, measure along the radius, is distance X. Distance R, L and X are geometrically related such that once R and L have been picked, X can be determined. When multiple links are joined together with a predetermined angle between the links, the plurality of teeth on each link align with the teeth on the other links to form a continuous spur gear.

Figure 10:
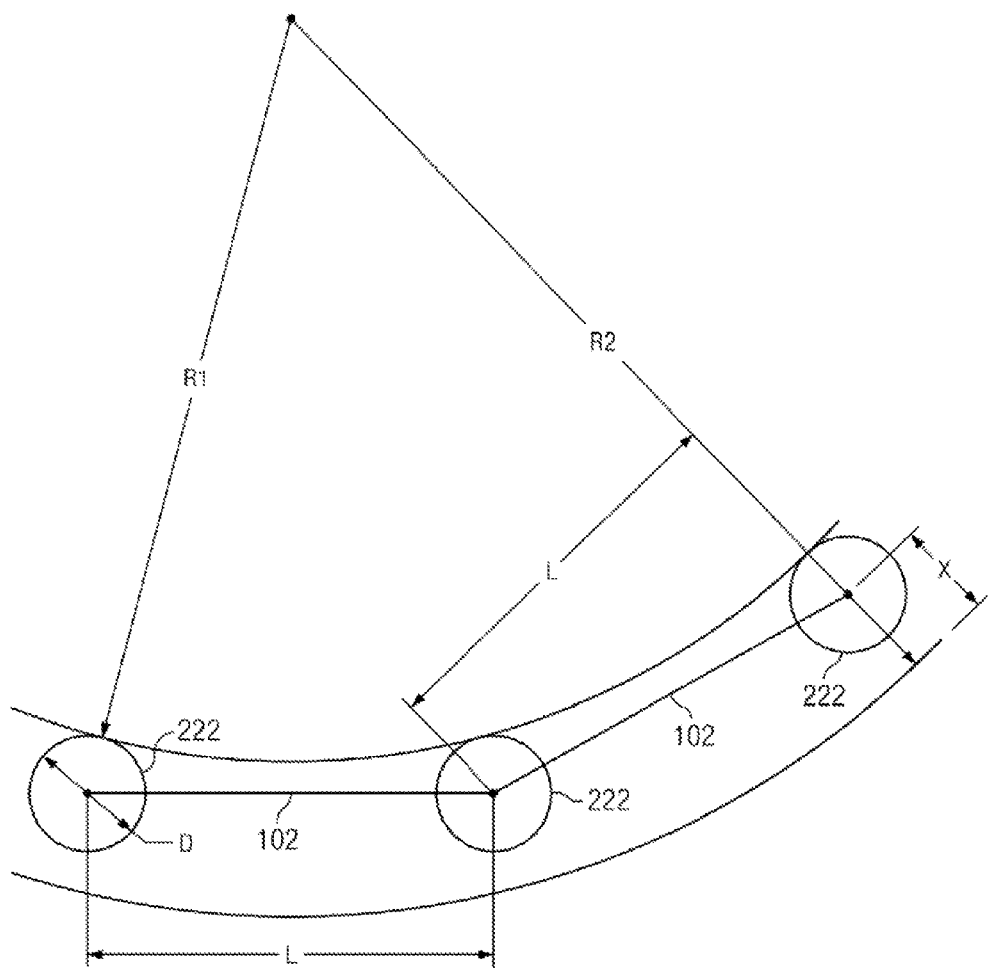
FIG. 10 is a block diagram of a chain in the curved section of a channel in an example embodiment of the invention.

The spur gear radius R, the diameter of the rollers on the pins and distance X determine the radius of the curved section of the channel that the chain rides in. FIG. 10 is a block diagram of a chain in the curved section of a channel in an example embodiment of the invention. The chain in FIG. 10 is represented by two links 102. Each link 102 is shown as a straight line. A roller 222 is attached to each end of the two links 102. The rollers are spaced apart by distance L. The rollers are riding in channel 220. Each roller has diameter D. Channel 222 has inner radius R1. Distance X is the distance between the center of the roller and the edge of the gear radius. The continuous gear formed by the two links 102 has a radius of R2. R1=R2−(X+½D).

Figure 11:
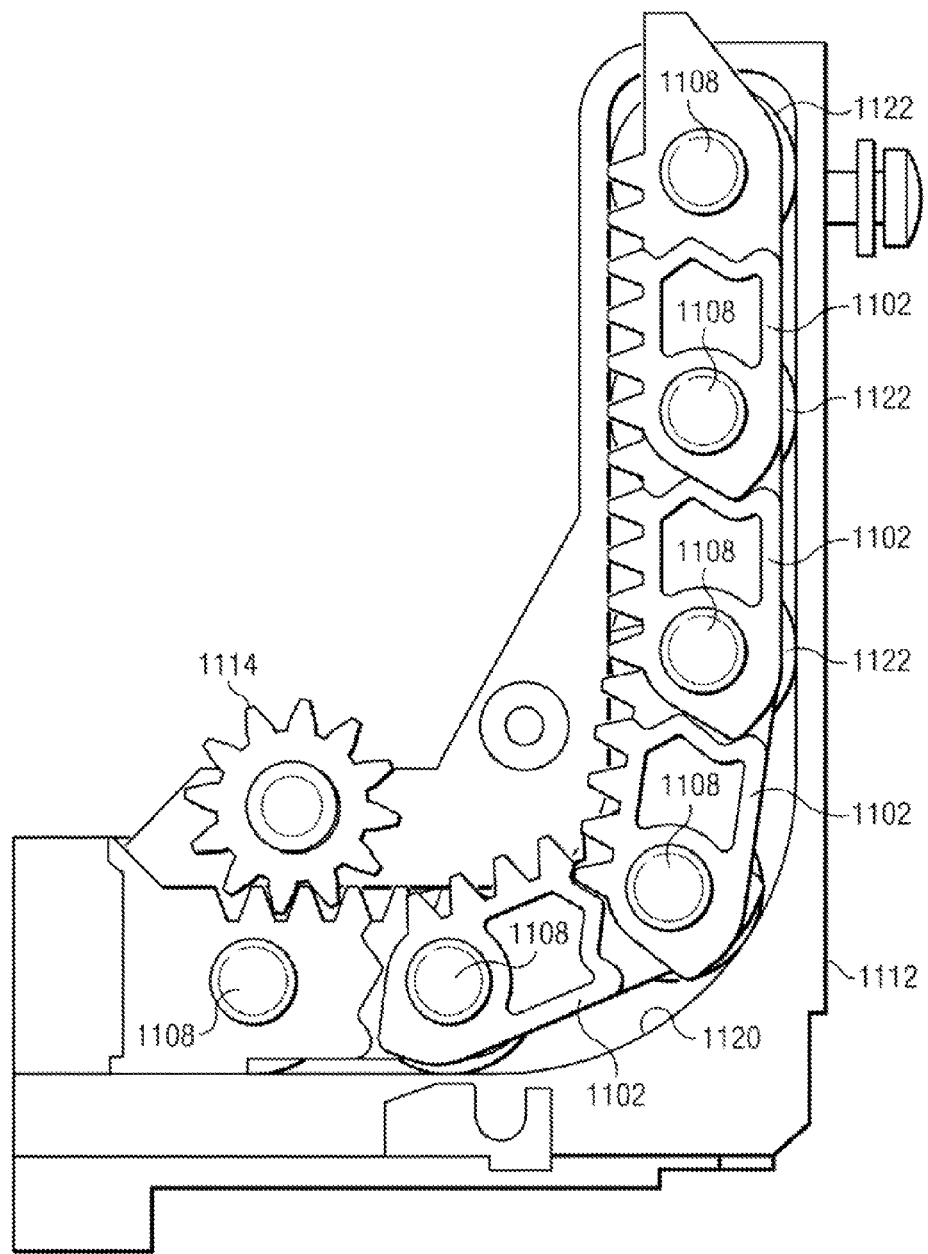
FIG. 11 is a cutaway side view of a chain positioning system 1100 in an example embodiment of the invention.

In another example embodiment of the invention, the teeth on each link form a rack of a rack and pinion system when the chain is in a straight line. FIG. 11 is a cutaway side view of a chain positioning system 1100 in an example embodiment of the invention. Chain positioning system 1100 comprises a chain, a guide plate 1112 and a drive gear 1114. The chain comprises a number of links 1102 linked together by a plurality of pins 1108. Rollers 1122 are mounted to the pins 1108 and ride in a channel 1120 formed in guide plate 1112. In this example, the teeth 104 are formed on the top side of each link 1102. In other example embodiments, the teeth could also be arranged on the bottom surface of links 1102.

Figure 12:
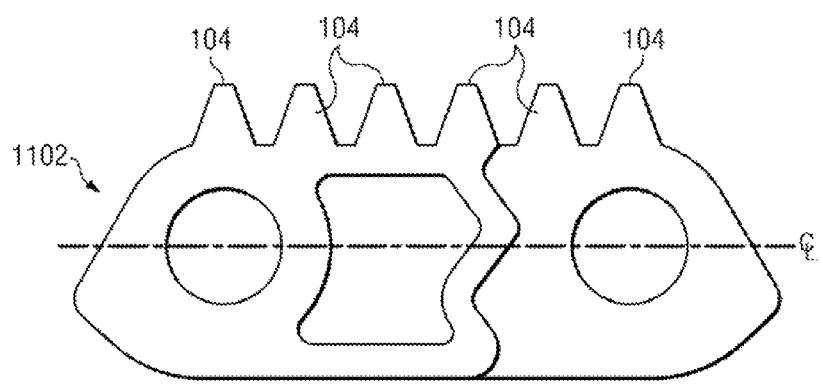
FIG. 12 is a side view of link 1102 in an example embodiment of the invention.

Drive gear 1114 is mounted in guide plate 1112 adjacent to a straight section of channel 1120. As chain enters the straight section of channel 1120 the angle between the links is aligned to 180 degrees. Because the teeth on links 1102 are formed along a straight line, the teeth form a continuous rack when the chain is in a straight section of the channel 1120. Drive gear 1114 meshes with the teeth in each link 1102 and is used to accurately position the chain. FIG. 12 is a side view of link 1102 in an example embodiment of the invention. The teeth 104 formed on the top side of link 1102 are form in a straight line. The teeth could also be formed in a straight line on the bottom side of each link 1102.

What is claimed is:

1. A printer comprising:
a chain positioning system, the chain positioning system comprising:
   a plurality of links joined together end-to-end by a plurality of pins;
   a guide plate having a channel formed therein;
   the chain moveably positioned in the channel and movable between a retracted position and an extended position, wherein a first end of the chain extends beyond the channel in a horizontal orientation when the chain is in the extended position;
   wherein the plurality of links interlock when the chain is in the horizontal orientation to form a beam that supports the weight of the chain as well as a device attached to the first end of the chain.

2. The printer of claim 1, wherein the device is a spittoon.

3. The printer of claim 1, wherein the interlocking links allow the first end of the chain to be displaced upwards in a vertical direction while preventing the first end of the chain from being displace downwards in the vertical direction when the chain is In the horizontal orientation.

4. The printer of claim 1, further comprising:
a plurality of teeth formed on a bottom side of each of the plurality of links, wherein the plurality of teeth on any two adjacent links of the plurality of links align to form a continuous spur gear when the angle between the two adjacent links is at a predetermined angle.

5. The printer of claim 4, further comprising;
a drive gear mounted adjacent to a curved section of the channel, the drive gear meshing with the plurality of teeth on the bottom of the plurality of links, the curved section of the channel having an inner radius that forms the predetermined angle between any two of the plurality of links located in the carved section of the channel, the drive gear moving the chain between the extended position and the retracted position.

6. The printer of claim 1, wherein the channel has a straight section where the chain exits the channel the straight section having a length that is at least two times the distance between a pin in one end of a first of the plurality of links and a pin in the other end of the first of the plurality of links.

7. The printer of claim 1, further comprising:
a plurality of rollers where a roller is mounted to each of the plurality of pins and where the rollers guide the chain in the channel.

8. The printer of claim 1, further comprising:
a plurality of teeth formed on a top side of each of the plurality of links, wherein the plurality of teeth on any two adjacent links of the plurality of links align to form a rack gear when the angle between the two adjacent links is at 180 degrees.

* * * * *